United States Patent [19]

Comer

[11] Patent Number: 5,461,368
[45] Date of Patent: Oct. 24, 1995

US005461368A

[54] AIR FILTER MONITORING DEVICE IN A SYSTEM USING MULTISPEED BLOWER

[75] Inventor: Anthony R. Comer, Louisville, Ky.

[73] Assignee: Comtech Incorporated, Jeffersonville, Ind.

[21] Appl. No.: 180,072

[22] Filed: Jan. 11, 1994

[51] Int. Cl.[6] .................................................. G08B 21/00
[52] U.S. Cl. ............................ 340/607; 340/603; 55/274
[58] Field of Search ..................................... 340/607, 603; 55/274; 116/268, 266, DIG. 25

[56] References Cited

U.S. PATENT DOCUMENTS

| | | |
|---|---|---|
| 410,502 | 9/1889 | Donner . |
| 1,090,669 | 3/1914 | Woodington et al. . |
| 2,214,092 | 9/1940 | Uhlhorn . |
| 2,320,368 | 6/1943 | Leathers . |
| 2,348,950 | 5/1944 | Anderson . |
| 2,475,850 | 7/1949 | Moore et al. . |
| 2,523,967 | 9/1950 | Nystul . |
| 2,669,707 | 2/1954 | Ehrman . |
| 2,700,362 | 1/1955 | Calling . |
| 2,746,416 | 5/1956 | Aufderheide . |
| 2,789,175 | 4/1957 | Mahr . |
| 2,815,733 | 12/1957 | Rykert . |
| 2,843,077 | 7/1958 | Leefer . |
| 2,921,157 | 1/1960 | Stein . |
| 2,927,659 | 3/1960 | Pabst et al. . |
| 3,071,914 | 1/1963 | Gesmar . |
| 3,104,542 | 9/1963 | Scoggins . |
| 3,201,772 | 8/1965 | Ladusaw . |
| 3,263,403 | 8/1966 | Ladusaw . |
| 3,412,786 | 11/1968 | Taylor . |
| 3,853,086 | 12/1974 | Asplund . |
| 3,934,543 | 1/1976 | Howard ................................ 340/607 |
| 3,936,284 | 2/1976 | Mason ................................ 340/607 X |
| 3,939,457 | 2/1976 | Nelson . |
| 4,033,733 | 7/1977 | Nelson . |
| 4,050,291 | 9/1977 | Nelson ........................................ 73/38 |
| 4,249,164 | 2/1981 | Tivy . |
| 4,311,037 | 1/1982 | Gotchel et al. . |
| 4,751,501 | 6/1988 | Gut ........................................... 340/607 |

*Primary Examiner*—Jeffery A. Hofsass
*Attorney, Agent, or Firm*—Penrose Lucas Albright

[57] ABSTRACT

An air filter monitoring device for determining the condition of the filter in a forced air system having a two speed blower, wherein the device comprises a pair of air pressure sensing probes, one probe being downstream of the blower and filter, and the other probe positioned to detect ambient air pressure, an air pressure differential sensor which includes a first air pressure differential sensor member adapted to be actuated by a first differential pressure and a second air pressure differential sensor member adapted to be actuated by a second differential pressure, a control circuit selectively interconnected between the blower and the first or the second air pressure differential sensor members for interconnecting the first air pressure differential sensor member to the blower when it is operating at a first speed and for connecting the second air pressure differential sensor member to the blower when it is operating at a second speed, and a pair of clogged air filter indicating members which are responsive to the actuation of the first air pressure differential sensor member when the blower is being operated at the first speed and responsive to the actuation of the second air pressure differential sensor member when the blower is being operated at the second speed.

15 Claims, 1 Drawing Sheet

AIR FILTER MONITORING DEVICE IN A SYSTEM USING MULTISPEED BLOWER

FIELD OF INVENTION

The instant invention is directed to a device for detecting clogged filters in forced air heating, air conditioning and ventilating systems. More particularly, the invention relates to a filter monitoring device for determining the condition of a filter in a residential system having a two speed blower.

BACKGROUND OF THE INVENTION

Virtually all forced air systems for heating and cooling interiors of residences or similar buildings include a filter to remove from air being circulated within, or moved into, the interior of the building, dirt, dust and other airborne foreign particles. Such filters are commercially available generally as fiber glass filters which require periodic replacement or they are electrostatic air cleaners which require periodic cleaning. Periodic or a preventive maintenance of a filtration system may be based upon a scheduled event such as annual maintenance of the system or otherwise scheduled. However, more often the filter is changed or cleaned because noticeable reduction in the movement of air through the system and the system does not seem to be working as well as it should. It requires a certain discipline to maintain an on going maintenance scheduled, if not a good memory, to assure proper system operating efficiency. If filters are changed too frequently waste occurs due to the time and effort required to substitute the new filters for the used ones in addition to the costs associated with obtaining and disposing of more filters than necessary and the cost of the filters. Cleaning electrostatic cleaners too often not only requires unnecessary work, but contributes to their wear and tear and to potential damage. However, if the filters are not changed or cleaned at sufficient intervals, operation of the system suffers, becoming less efficient and more costly.

The situation is complicated because filters tend to accumulate material at different rates depending upon the seasons, activities within the buildings and whether the system is being used for heating wherein the blower is generally operated at a low speed or is being operated in the higher speed cooling mode. Accordingly, a "watch dog" type of device that continues to monitor the condition of filtration in a forced air system, irrespective of the variability of airborne dust content and the mode of operation, minimizes operating costs while maximizing operating efficiency. Automatic systems for detecting the clogging air filters are known. They typically involve sensing the pressure drop across the air filter. As the filter becomes increasingly dirty, static pressure across it begins to increase, depending upon the air velocity of the air moving through the duct wherein the air filter is located. A system for detecting a clogged filter in a variable volume system is disclosed in U.S. Pat. No. 4,751,501 which issued Jun. 14, 1988 to E. Gut. This system includes a device which senses the air pressure differential across the filter. The device has an alarm to indicate the need for filter replacement and depends upon a somewhat complex air flow velocity sensor and controller to compensate for changes in air velocity. Such sensor and controller prevent premature filter replacement indication by the device if the differential pressure across the filter increases solely to an increased in the volume of the air moving through the duct. U.S. Pat. No. 3,934,543 which issued to D. Howard on Jan. 27, 1976 is directed to apparatus for monitoring the condition of an air filter comprising a mechanical device which is operated by means of diaphragm and levers to display a "flag" when an increase in the pressure differential across the filter is sensed. The device includes an audible alarm option and adjustment means are provided for the mechanism that indicate the need for replacement. Unlike the device in the above described patent to Gut, however, neither the selector nor automatic provisions are provided to compensate for changes in the volume of air flowing through the duct. U.S. Pat. No. 2,921,157 to J. Stein which issued Jan. 12, 1960 is for a filter gauge that is also a mechanical device which displays a "flag" or causes an electrical indication mechanism to operate when the predetermined pressure differential levels are achieved. The sensitivity of this device is adjustable for specific applications. However, Stein's filter gauge does not include a means for selecting distinct means to indicate different air volume flows and there are also no provisions for automatic compensation of different volume air flows. Devices such as those described above tend to be costly and complex to produce, have more moving parts than desirable for the specific functions and unless cleaned regularly their operations may be constricted or prevented by the accumulation of dust and wear and tear.

SUMMARY OF THE INVENTION

A common and efficient air conditioning system supplies residential air through a duct system with both heating and cooling heat exchangers included in the duct together with a fan or blower for circulating the air. When the air conditioning system of this type is used both to heat and cool, the blower typically has a summer or high speed operating rpm and in the winter a low speed operating rpm. The system will also generally have one of two types of filtration units, either a fiber glass or fiber mat filter on one hand, or an electrostatic filter on the other. The efficiency of the filtration unit is determined by measuring the relative pressure in the duct between the filtration unit and the fan. Inasmuch as the filtration unit is typically installed so that it is upstream of the fan, the efficiency of the filtration unit can be measured by the reduction in pressure on the downstream side of the filtration unit relative to the ambient air pressure. However, this presupposes a constant volume of air flow through the filtration unit which does not occur when the blower is operated at variable or different rpms. The air pressure in the duct upstream of the filter is the same or essentially the same as the ambient air pressure immediately outside the duct system.

The instant invention involves the installation of a probe on the downstream side of the filtration unit, which is connected to a detecting device having two separate differential pressure measuring modes which are automatically selectively engaged depending upon whether the blower motor is being operated at a high summer speed or a low winter speed. The measuring modes include two separate adjustable settings for individual summer/winter pressure differentials that provide a signal when there is a need to change or clean the filtration unit. The measuring modes each have an electrical switch independently and adjustably responsive to the applicable air pressure differential. The automatic selection of the appropriate switch in the dual air differential pressure switch system is operationally governed by the use of a transistor to open or close the circuit to that switch which is sensitive to the lower pressure differential received at the dual switch. When the transistor is inactivated then the dual switch responds effectively only to the higher differential pressure threshold. This occurs when the air pressure differential pressure (set to respond to the higher speed air flow used for summer operation setting) is the predetermined air pressure differential pressure that exists when the filter is due to be changed or cleaned. When the dual switch is in an active status and has been activated by meeting the predetermined threshold air pressure differential, the pressure switch completes the circuit which activates a silicon control rectifier to energize a visual alarm or audible alarm or preferably both. For situations wherein the dual switch is only closed momentarily by the action of the differential pressure, a reset switch is provided wherein the alarm may be secured and will remain so until the threshold pressure differential is again reached to close the dual switch involved.

An important advantage of the invention is that it utilizes solid state circuitry insofar as feasible so that the accumulation of dust or the like is less likely to cause malfunction. This also tends to minimize the cost of the detector. Another important object of the invention relates to the selectivity of the system to operate either in the winter or summer when the filter is being subjected to different air flow rates. Moreover the circuit of the invention is adaptable so it can be electrically powered by either of several common "host" systems. This adaptability permits the builder to take advantage of the "on board" electrical system when the system is being installed at the same time as the heating and/or air conditioning system is being constructed, Alternatively, the circuit is adaptable to receive power from a battery for applications wherein the installation is made on existing heating/air conditioning systems. In either case, the relative simplicity of the system facilitates its installation. The system also is designed so that its power consumption is minimal and this, in turn, extends the effective battery life for installations in existing air conditioning system. By utilizing both visual and hearing indicating devices, the system is "user friendly" in that it accommodates people with who may have visual impairment or those with impaired hearing.

Other objects, adaptabilities and capabilities of the invention will be appreciated by those skilled in the art as the description progresses, reference being had to the accompanying drawings, in which:

DESCRIPTION OF THE PREFERRED EMBODIMENTS

Figure 1:
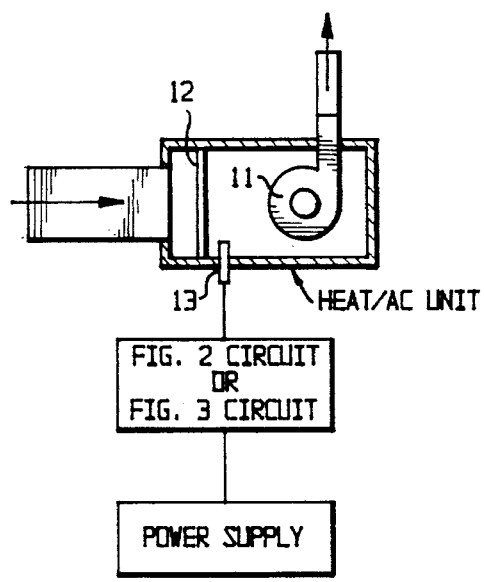
FIG. 1 is a schematic illustration of a clogged filtered detection system in accordance with the present invention.
Figure 2:
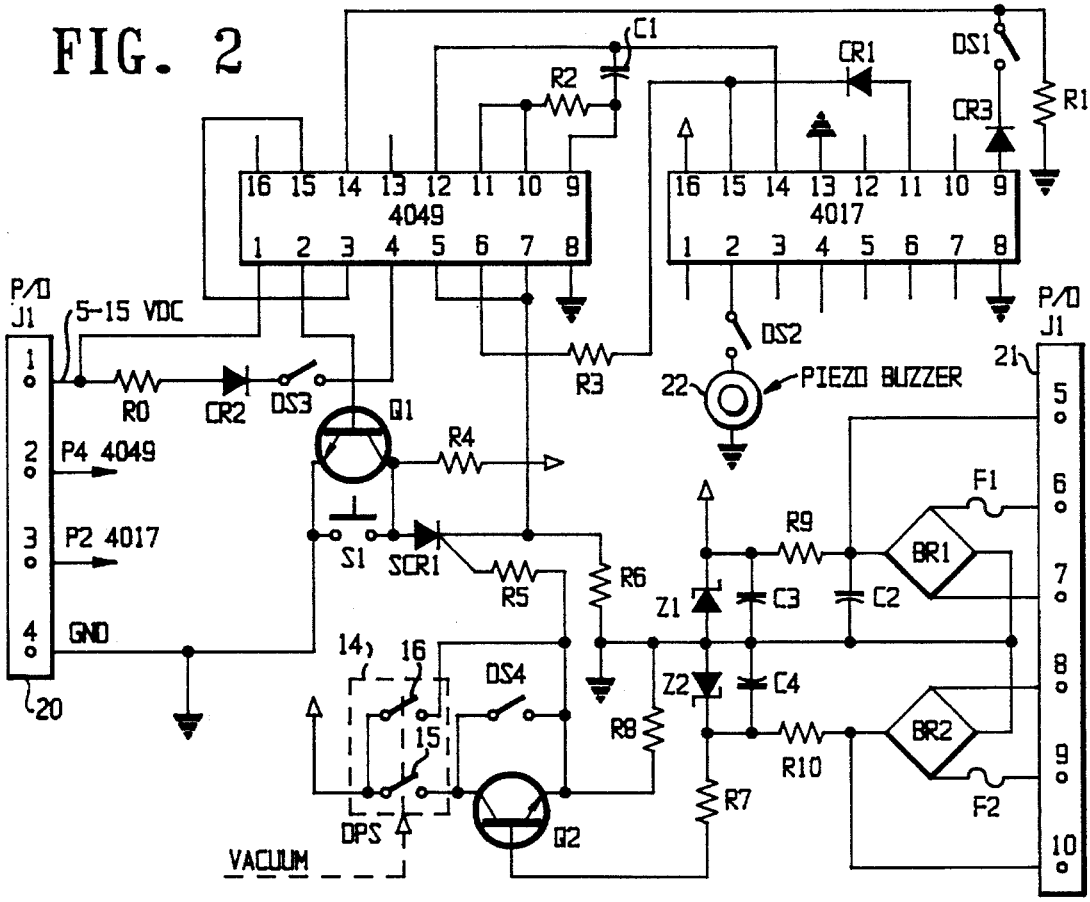
FIG. 2 is a diagram of the electrical circuit for a first embodiment of the invention.

Referring to FIGS. 1 and 2, as the filter 12 becomes clogged with airborne contamination, air pressure between filter 12 and a squirrel cage blower 11 decreases. This pressure decrease is sensed by a diaphragm in a dual pressure sensor 14. Pressure sensor 14 is a known and available type of component which senses differential pressures with a sensitivity as low as one tenth of an inch of water. It includes an electrical interface for an electrical circuit to signal when the threshold of a predetermined pressure differential has been reached. Pressure sensor 14 includes, a diaphragm mechanism for actuating separate switches for different threshold differential pressures. Sensor 14 is available in operating ranges of 0.1 inches of water to 550 inches of water and, for a particular operation, the higher threshold can be an order of magnitude greater than the lower threshold. The threshold pressure differentials, as such, of the sensor 14 are adjustable. A dual pressure sensor which can be used in the invention is identified as "MPL-504", manufactured by Micro Pneumatic Logic, Inc. of Fort Lauderdale, Fla.

A decrease in the air pressure conveyed from probe 13 to sensor 14 (which is an increase in differential pressure) causes a diaphragm within the sensor 14 to flex or move toward two sets of normally open electrical contacts of switches inside the dual pressure sensor. This movement causes the gaps between the contacts to be successively closed. It should be understood that the gaps between the contacts are adjustable and are set so that each switch is closed at an air pressure differential which indicates that the filter 12 is due to be replaced, depending upon whether the system is in a summer cooling or a winter heating mode.

A second probe which senses ambient air pressure may be simply an opening to the atmosphere in sensor 14.

In pressure sensor 14, as indicated diagrammatically in FIG. 2, reference numeral 15 represents the switch which is closed when the threshold pressure differential in a winter heating environment is involved. Switch 16 is closed by the diaphragm mechanism when the system is operating in summer cooling mode.

Typical pressure differentials which indicate that the filter needs replacement are in the range of 0.2 to 0.4 inches of water. This can vary depending on the size and rpm of the blower, the size and configuration of the duct system and the size and construction of the filter media. In general, for a residential unit in winter operation, filter replacement is indicated when the static pressure has increased by 0.2 inches of water. A typical residential unit incorporates a squirrel cage type blower which is nine and one-half inches wide by nine and one-half inches in diameter and operates at 1050 rpm. Its CFM (cubic feet per minute) output is approximately 1660 at 0.6 inches of water static pressure utilizing a spun fiber glass filtration media measuring sixteen inches by twenty inches by one inch. In winter, however, the blower's rpm is typically 825 with an output 1250 CFM at 0.6 inches of water static pressure.

The circuit shown in FIG. 2 is provided with two voltage outlet panels 20 and 21 to provide a variety of supply and signal voltages. Each panel has numbered connections, 1–4 for panel 20 and 5–10 for panel 21. For supply current, 24–28 volts alternating current, outlets 6 and 7 are used. For 24–28 volts direct current, outlets 4 and 5 are used. For accommodating 5–15 volts direct current, outlets 1 and 4 are used. For signal voltages, connections 8 and 9 accommodate 24–28 volts alternating current, connections 4 and 10 accommodate 24–28 volt direct current, and for 5 to 15 volts direct current, connections 4 and 10 may be employed. However, for the latter, the 15 volt zener diode Z1 should be removed and replaced by a conductive jumper.

Figure 3:
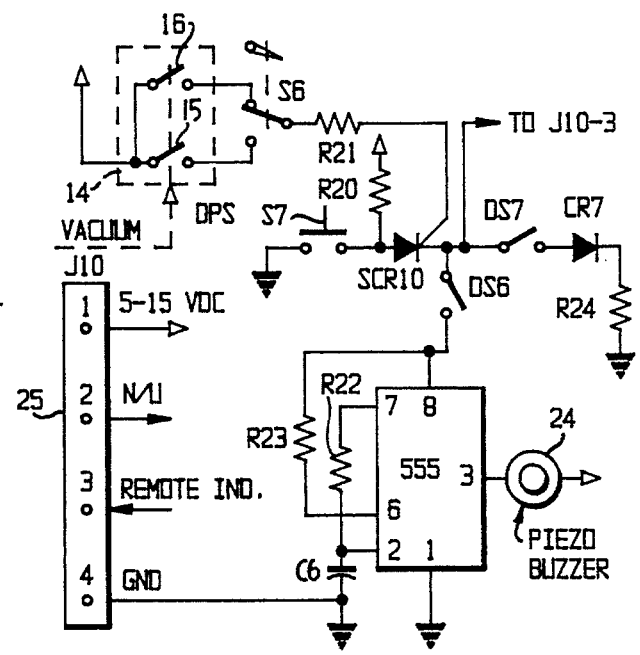
FIG. 3 is a diagram of a further electrical circuit in accordance with the second embodiment of the invention.

Typical supply voltage amperes should not exceed 500 ma for the systems disclosed in reference FIGS. 2 and 3 and the signal voltage should not exceed 50 ma.

Manual switching for summer or winter operation is controlled by a two pole dip switch DS4 which is opened for summer operations and closed for winter operations. However, for automatic switching, switch DS4 is retained in its open position. For automatic switching to winter operations, switch DS4 is bypassed by activation of the transistor Q2 (MPN-2N4401). Transistor Q2 is activated when signal voltage is supplied to connections 8 and 9, the signal voltage being rectified by bridge rectifier BR2 and reduced by zener diode Z2 which is the same type of diode as the zener diode Z1. Then, closure of switch 15 activates a silicon controlled rectifier SCR1, which supplies voltage to pins 5 and 7 of integrated circuit 4049. This automatically sets pins 4 and 6 in integrated circuit 4049 to a "low" voltage state which activates, via a normally closed switch DS3, diode CR2, which is a light emitting diode. In addition, pin 15 of integrated circuit 4017 is set to a low state by pin 6 of integrated circuit 4049, that then initiates the cycle of integrated circuit 4017 causing the piezo buzzer 22 to give short duration sounds or beeps via normally closed switch DS2.

With DS1 open, the intermittent buzzing or beeping continues until the blower stops and a reset signal is transmitted by pressing reset switch S1. With DS1 closed, a pulse from pin 9 of integrated circuit 4017 travels through diode CR3 and normally closed switch DS1 to pin 14 of integrated circuit 4049. This, in turn, activates transistor Q1, which grounds silicon controlled rectifier SCR1 and disarms the alarms automatically. However, if switch 15 remains closed by the diaphragm, silicon controlled rectifier SCR1 is again energized through the resistor R5, and the cycle is repeated as long as switch 15 remains closed.

In summer, when the air conditioning is used, the squirrel cage blower 11 runs at its higher speed and creates a higher pressure differential at probe 13 in the system. However, the transistor Q2 is not energized by a control signal from the bridge rectifier BR2, and transistor Q2 is, therefore, effectively removed from the circuit. Instead, the closing of switch 16 activates silicon controlled rectifier SCR1 via resistor R5, and the cycle described above repeats itself due to the closure of switch 16 rather than switch 15 by the higher pressure differential. Switch 15 is in a closed condition, but cannot complete the circuit to activate silicon controlled rectifier SCR1 because Q2 is "off". Switch 16 is adjusted to a predetermined pressure differential to indicate when a filter replacement is required for summer operations. If it is desired to secure the operation of the piezo buzzer 22, this can be accomplished by opening switch DS2 which is normally closed. Also, a remote audio alarm can be provided, with switch DS2 open, via connections 3 and 4 of panel 20.

It will be noted that connector 2 leads to pin 4 of Integrated Circuit 4049 and connector 3 leads to pin 2 of Integrated Circuit 4017.

In view of the foregoing, it will be appreciated that in winter, when the thermostat calls for heat, transistor Q2 is energized through resistor R7, zener diode Z2 and bridge rectifier BR2 by the same control that energizes the gas valve of the furnace. The control voltage that controls the gas valve is typically 24 VAC. This control voltage is connected to numbered connections 8 and 9 of panel 21 and then rectified by bridge rectifier BR2, reduced in value by zener diode Z2 and passed through resistor R7 to the base of the transistor Q2. The voltage introduced at the base of transistor Q2 is approximately 5 volts of direct current (after being rectified and reduced) and transistor Q2 is then caused to "turn on". Then when the switch 15 in series with transistor Q2 closes due to a predetermined pressure drop across the filter being monitored, a circuit is completed through the first switch 15, through transistor Q2 and through resistor R5 to turn on the silicon control rectifier, SCR1 which, in turn, initiates the alarm indication.

In summer (when the thermostat calls for air conditioning) the transistor Q2 is not activated as indicated above because of the lack of a control signal at its base. Therefore, switch 15 which is set for winter operations is inhibited by the deactivation of transistor Q2 and cannot complete the circuit to activate silicon control rectifier SCR1. Therefore, the silicon control rectifier SCR1 can only be activated by the closure of switch 16 that has a wider gap to compensate for the increased vacuum produced by the higher velocity summer blower speed.

The visual alarm or LED, CR2, is controlled by the integrated circuit 4049. It will be appreciated that the LED, CR2, may optionally be a standard LED or a flasher LED. Opening switch DS3, which is normally closed, secures the light emitting diode or LED, CR2 from the system just as opening switch DS2 does for the piezo buzzer 22. In a similar manner, a remote LED can be provided, with switch DS3 open, via connections 1 and 2 of panel 20. Such remote LED may be mounted if desired, on a thermostat that controls the temperature of a space heated or cooled by the air conditioning/heating system involved.

By closing switch DS1, an automatic reset performed by transistor Q1, responsive to integrated circuits 4017 and 4049, is placed in operation whereby the audio alarm 22 sounds only when the heating or air conditioning unit is operating. Otherwise, if switch DS1 is open, the audio alarm sounds continuously by intermittent beeping or buzzing, until manual reset button S1 is pressed.

The embodiment shown in FIG. 3 is for a low power consumption circuit intended for battery applications. Here, a manual toggle switch S6 is provided for switching between summer with high blower speeds, and winter with lower blower speeds. A piezo buzzer 24 may, if desired, be replaced by an LED. Such an alarm, whether a piezo buzzer or an LED, is controlled by an integrated circuit 555 so that it is intermittently activated. By opening switch DS6, the alarm 24 is effectively removed from the circuit. A visual alarm or LED, CR7, is controlled by a silicon controlled rectifier SCR10. The latter can be removed from the circuit by opening the switch DS7. If desired, a remote LED, such as might be installed on a thermostat control, can be connected to connections 3 and 4 of panel 25.

With respect to FIG. 3, it will be appreciated as filter 12 becomes clogged with airborne contamination, the pressure differential between filter 12 and ambient pressure is increased, and such increase in differential pressure is transmitted by the diaphragm in the dual pressure sensor 14. Increased pressure differential causes the diaphragm in sensor 14 to flex and sequentially close two sets of normally open electrical contacts inside the sensor 14. Such movement successively and selectively closes the gaps between the contacts. It will be understood that the gaps between the contacts are individually adjustable, and are set to close at a predetermined pressure differential which represents, depending upon whether the winter heating mode or the summer cooling mode is in operation, the degree of clogging of filter 12 whereby it is considered best from operational and cost standpoints for the used filter 12 to be replaced by a new filter or if electrostatic for filter 12 to be cleaned. With the closing of the contacts in the sensor 14 of switch 15, which governs the pressure differential across the filter 12 during winter when the blower is at its lower rpm operations, these closed contacts activate the silicon controlled rectifier SCR10, via current from connection 1 of panel 25, the LED designated CR7 is energized through normally closed switch DS7. Piezo buzzer 24 is also activated intermittently via the integrated circuit 555. With switch DS6 being in its normally closed position, buzzer 22 thus continues to sound intermittently, and with switch DS7 in its normally closed position, LED CR7 remains lighted until the manual reset switch S7 is pressed. This assumes that switch 15 was closed temporarily and is again open. If the dirty filter remains in the heating/air conditioning units, the alarm(s) will reactivate when the blower of the unit starts again. If cleaning or replacement of the filter is not possible, it may be desirable to open switch DS6 until the filter has been replaced or cleaned.

The system works in the same manner in the summer months, together with the higher speed of the squirrel cage blower 11, when toggle switch S6 is in position, as shown in FIG. 3, to be in series with switch 16 when closed.

From the foregoing, it will be appreciated that the piezo buzzer of the system shown in FIG. 3 sounds only if the dip switch DS6 is closed and will continue to sound intermittently until the furnace blower has stopped and the manual reset switch S7 is pressed.

In the embodiment disclosed in FIG. 2, the piezo buzzer 22 sounds only when the dip switch DS2 is closed. If the switch DS1 is open, (with switch DS2 closed) the piezo buzzer continues to sound intermittently until the furnace blower is stopped and the manual reset button S1 is pressed. Switch DS1 completes the circuit for the automatic reset from the voltage source connected to pin 9 of integrated circuit 4017, through diode CR3 and switch DS1 to pin 14 of integrated circuit 4049. If switch DS1 is closed, the piezo buzzer continues to sound only when the furnace blower is running or until the furnace blower has stopped. It will also be appreciated that one is not required to press the manual reset S1 to silence the intermittent buzzer if switch DS1 is closed.

In FIG. 2, resistors R9 and 10 are provided to stabilize the DC voltage generated through the BR1 and BR2 rectifiers. The value of Z1 should normally be 12 volts and that of Z2 should normally be 5 volts. However, the final voltages of both Z1 and Z2 should be fine-tuned to correspond to the value of the host voltages which are supplied to the system.

When sufficient dirt and the like have accumulated on and within a filter so that its resistance to the flow of air reaches its replacement threshold, the audio alarm piezo buzzer sounds (for say one second at approximately 65 decibels every five or six seconds) until the reset signal (either automatic or manual) causes the circuit to be reestablished. It will be appreciated that the duration of the sound and the period of silence of the audio alarm is determined by, in FIG. 2, the values of the resistor R2 and the capacitor C1. The value of resistor R23 serves the same purpose in the circuit of FIG. 3. These can be modified as well known in the art to provide the desired "on" and "off" durations of the audio alarms.

If it is desired to secure the audio alarm until the filter can be cleaned or replaced, as previously noted, the switch DS2, in FIG. 2 for example, can be opened to remove the alarm from the circuit. However, unless this switch is again closed after the filter has been cleaned or replaced, the visual alarm is the only means to indicate a need for filter replacement. To remind an absent-minded individual to close the switch such as DS2, the switch is conveniently located so that it is not only easy to secure, when desired, but also so that its "open" or "closed" state is readily observed by the individual replacing or cleaning the filter.

The device which utilizes the circuit illustrated in FIG. 2 can accommodate source voltages from the host unit. Therefore that device should be located at or near the blower housing where the "host" voltages are located which is also located near to where the air filter is housed. This circumstance facilitates the location of switch DS2 with an appropriate label where it would be difficult to miss by any person who is replacing or cleaning the filter.

It will also be understood that the circuit of FIG. 2 includes an automatic reset feature whereby the alarms are activated only when the blower of the heating/air conditioning unit is running. With such feature, when the blower stops the audio alarm remains silent until the blower starts again. This feature may also prove useful to the absent-minded individual who is thus reminded each time the blower starts that the filter needs to be replaced.

All resets (either automatic or manual) in the circuits of FIGS. 2 and 3 function to reset or deactivate the corresponding silicon control rectifier (SCR1 or SCR10) that initiates the corresponding alarms. Deactivation of the SCR is accomplished simply by grounding the anode of the SCR. It will be noted in FIG. 2 that SCR1 can be grounded manually through reset switch S1 and automatically through transistor Q1. These resets are effective only when the blower is not running or when the filter is sufficiently clean. In other words, if the blower is running and the filter is clogged whereby the diaphragms of sensor 14 are closed, it will be appreciated that a reset pulse will not deactivate the silicon control rectifier and the alarms remain energized. Once the blower has stopped, a reset pulse then deactivates the alarms.

Although the preferred embodiments of the invention are described above, it is to be understood that the invention is capable of other adaptations and modifications with the scope of the following claims:

Having thus described my invention, what I claim as new and desire to secure by Letters Patent of the United States:

1. An air filter monitoring device for determining the condition of a filter in a forced air system having a two-speed blower, the device comprising:

a pair of air pressure sensing probes, one of said probes being in position to sense the air pressure downstream between said blower and said filter in said air system, and the other of said probes positioned to sense ambient air pressure;

an air pressure differential sensor including a first air pressure differential sensor, member and a second air pressure differential sensor member said first air pressure differential sensor member adapted to be actuated by a first differential of air pressure between that sensed by said one probe and said other probe said second air pressure differential sensor member adapted to be actuated by a second differential air pressure between that sensed by said probe and that sensed by said other probe;

a control circuit interconnecting said blower with said first or said second air pressure differential sensor members, whereby when said blower is operating at a first speed, it is operatively associated with said first air pressure differential sensor member, and when said blower is operating at a second speed, it is operatively associated with said second air pressure differential sensor member; and a pair of clogged air filter indicia members connected to said control circuit which are responsive to actuation of said first air pressure differential sensor member when said blower is being operated at said first speed and alternately are responsive to actuation of said second air pressure differential sensor member when said blower is being operated at said second speed.

2. An air filter monitoring device in accordance with claim 1, wherein said air pressure differential sensor comprises a dual pressure sensor which includes a diaphragm, said diaphragm being operatively connected to said probes and further operatively connected to actuate said first and second air pressure differential sensor members.

3. An air filter monitoring device in accordance with claim 2, wherein said first and second air pressure differential sensor members each comprise an electrical switch which is normally open and closed in response to movement of said diaphragm.

4. An air filter monitoring device in accordance with claim 3, wherein each said electrical switch comprises a gap between its electrical contacts in its opened position, and adjustment means being provided in said device for adjusting the amount of each said gap.

5. An air filter monitoring device in accordance with claim 1, wherein said control circuit comprises a pair of integrated circuits, said pair of air filter indicia members comprising a sound alarm and a visual alarm, one of said integrated circuits connected to activate said sound alarm, and the other of said integrated circuits connected to actuate said visual alarm.

6. An air filter monitoring device in accordance with claim 1, comprising an electrical current selection means for accommodating supply voltages of 24–28 volts alternating current, and 5–15 and 24–28 volts direct current and signal voltages of 24–28 volts alternating current, and 5–15 and 24–28 volts direct current.

7. An air filter monitoring device in accordance with claim 1, wherein said first differential air pressure is in a range of 0.2 inches of water; and said second differential air pressure is in a range of approximately 0.3 inches of water.

8. An air filter monitoring device for determining the clogged condition of a filter in a forced air system having a two-speed blower, the device comprising:

a pair of air pressure sensing probes, one of said probes being positioned to sense the air pressure downstream between said blower and said filter in said air system, and the other of said probes positioned to sense ambient air pressure;

an air pressure differential sensor, including a first air pressure differential sensor member and a second air pressure differential sensor member said first air pressure differential sensor member adapted to be actuated by a first differential air pressure between that sensed by said one probe, and that sensed by said other probe, said second air pressure differential sensor member adapted to be actuated by a second differential air pressure between that sensed by said one probe and that sensed by said other probe;

a control circuit interconnecting said blower selectively with said first and second air pressure differential sensor members, said control circuit comprising selection means for selectively providing when said blower is operating at a first speed that it is operatively associated with said first air pressure differential sensor member and when said blower is operating at a second speed, it is operatively associated with said second air pressure differential sensor member;

a clogged air filter indication member connected to said control circuit which is responsive to actuation of said first air pressure differential sensor member when said blower is being operated at said first speed, and is alternately responsive to actuation of said second air pressure differential sensor when said blower is operating at said second speed; and an electrical supply source for operating the device comprising a direct current having a voltage in the range of 5–15 volts.

9. An air filter monitoring device in accordance with claim 8, wherein said air pressure differential sensor comprises a dual pressure sensor that includes a diaphragm, said diaphragm being operatively connected to said probes and also being operatively connected to actuate said first and second air pressure differential sensor members.

10. An air filter monitoring device in accordance with claim 9, wherein said first and second air pressure differential sensor members each comprises an electrical switch which is normally open and is closed in response to movement of said diaphragm.

11. An air filter monitoring device in accordance with claim 8, wherein each said electrical switch comprises a gap between the contacts of said switch in an open position, and adjustment means being provided for adjusting the amount of each said gap.

12. An air filter monitoring device in accordance with claim 8, wherein said control circuit comprises an integrated circuit and a pair of said air filter indicia members comprising a sound alarm and a visual alarm, said integrated circuit connected to said sound alarm causing it to produce sound intermittently when said selected first air pressure differential sensor member, or said second air pressure differential sensor member is actuated.

13. An air filter monitoring device for determining the condition of a filter in a forced air system, wherein said filter and a two-speed blower are situated in ducts for conveying air through said system, the device comprising:

a pair of air pressure sensing probes, one of said probes being positioned inside said ducts to sense air pressure downstream between said blower and said filter in said duct, and the other of said probes positioned to sense the air pressure upstream of said filter;

an air pressure differential sensor comprising diaphragm means responsive to the air pressure differential between said probes, said air pressure differential sensor including a pair of electrical switches which are opened and closed by said diaphragm means in response to said air pressure differential between said probes, one of said switches adapted to be actuated by a first selected predetermined pressure differential between said probes when said blower is operating at its lower speed, and the other of said switches connected to be actuated by said air pressure differential between said probes when such air pressure is at a second selected predetermined pressure differential and said blower is being operated at its higher speed;

selection means for selectively connecting one of said switches to a control circuit, clogged air filter indicia means connected to said control circuit, said indicia means being responsive selectively to the closing of one of said switches corresponding to the speed of the blower when the air pressure differential between said probes is at or above the selected first or second predetermined pressure differential corresponding to whether said blower is being operated at said higher speed or at said lower speed.

14. An air filter monitoring device in accordance with claim 13, wherein said control circuit comprises a pair of integrated circuits, and said air filter indicia means comprises a sound alarm and a visual alarm, one of said integrated circuits connected to activate said sound alarm, and the other of said integrated circuits connected to activate said visual alarm.

15. An air filter monitoring device in accordance with claim 14, comprising alarm isolation means for selectively deactivating either of said alarms.

* * * * *